United States Patent [19]

Gasparaitis et al.

[11] Patent Number: 5,016,956
[45] Date of Patent: May 21, 1991

[54] LIGHTING PANEL FOR LIQUID CRYSTAL DISPLAY

[75] Inventors: Bernard V. Gasparaitis, Tamarac; William J. Knutson, Coral Springs, both of Fla.

[73] Assignee: Motorola, Inc., Schaumburg, Ill.

[21] Appl. No.: 415,849

[22] Filed: Oct. 2, 1989

[51] Int. Cl.⁵ .................................................. G02B 6/00
[52] U.S. Cl. ................................. 350/96.10; 350/96.24
[58] Field of Search ........................... 350/96.10, 96.24

[56] References Cited

U.S. PATENT DOCUMENTS

| | | | |
|---|---|---|---|
| 4,212,516 | 7/1980 | Sawamura | 350/96.24 |
| 4,763,984 | 8/1988 | Awai et al. | 350/96.24 |
| 4,845,596 | 7/1989 | Mouissie | 350/96.24 X |
| 4,874,227 | 10/1989 | Matsukawa et al. | 350/96.24 X |
| 4,907,132 | 3/1990 | Parker | 350/96.30 X |

Primary Examiner—John D. Lee
Assistant Examiner—Phan T. Heartney
Attorney, Agent, or Firm—Michael J. Buchenhorner

[57] ABSTRACT

A lighting panel (100) comprises a mat (106) of transparent optical fiber stands (202) woven together and encapsulated in a transparent panel element (104).

10 Claims, 2 Drawing Sheets

LIGHTING PANEL FOR LIQUID CRYSTAL DISPLAY

TECHNICAL FIELD

This invention relates generally to liquid crystal (LC) displays.

BACKGROUND

LC displays are commonly used in various kinds of electronic apparatus, such as portable radios because of their relatively low current consumption and small size. However, under certain conditions, LC displays may require means for lighting the characters being displayed. Reduction in the size of portable radios, also reduces the space available for LC displays and among the most space-consuming components of LC displays are the means used for lighting the displays. Therefore, it is highly desirable to reduce the size of those lighting means while maintaining acceptable lighting for the display.

SUMMARY OF THE INVENTION

Accordingly, it is an object of the present invention to overcome the size detriments of prior LC displays.

Briefly, according to the invention, a lighting panel comprises a plurality of transparent optical fiber strands collected together into a mat and encapsulated in a transparent panel element.

DETAILED DESCRIPTION OF THE PREFERRED EMBODIMENT

Figure 1A:
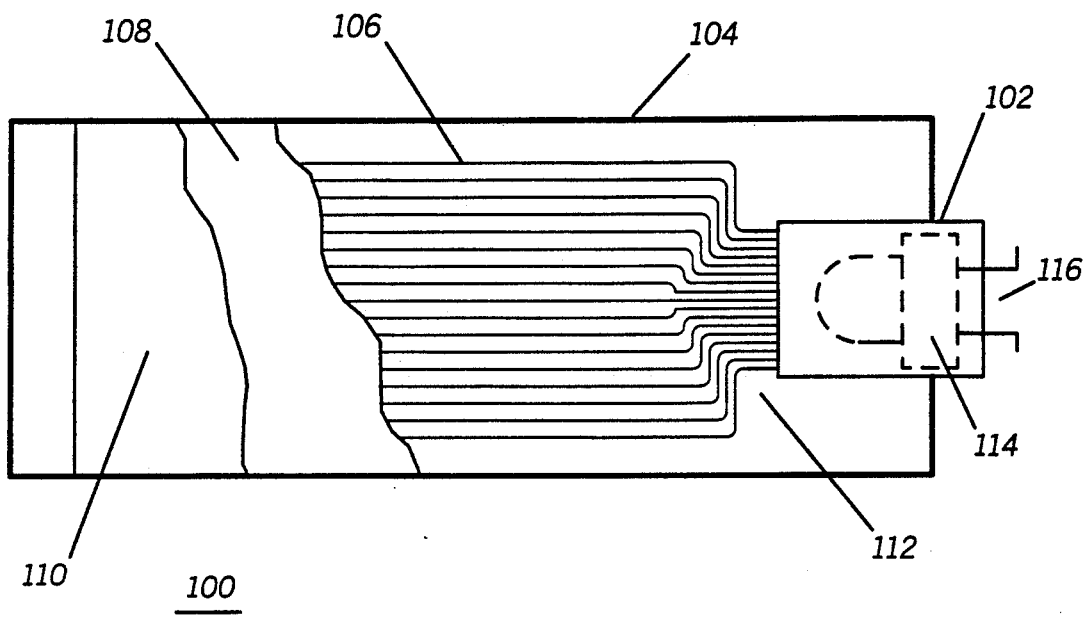
FIG. 1A shows a light panel in accordance with the present invention.

Referring to FIG. 1A, a light panel 100 in accordance with the present invention is shown. A mat 106 comprises optical fiber strands collected (i.e., bunched) or formed (i.e., the strands form angles with respect to each other) together. The strands of the mat 106 are also woven into a bundle forming an end 112 for receiving light. A ferrule 102 is connected to the bundled end 112 of the optical fiber mat 106, to receive a light source, such as a light emitting diode, or LED, 114 (shown in broken lines). The LED 114 is preferably a ½ intensity (20°) GaP-Super Bright LED. The LED 114 has a pair of electrodes 116 which activate the LED 114 when a specific voltage is is applied across them. The light produced by the LED 114 is dispersed by the optical fiber mat 106 because of its woven structure. Such dispersion of light improves the quality of the lighting because it uniformly illuminates a selected area while using only one source of light (i.e., the LED 114).

The optical fiber mat 106 is encapsulated in an optically clear panel element 104, preferably formed from epoxy. The panel 104 disperses the light uniformly onto its surface areas. A phosphorescent coating 108 may be applied (e.g., using silk screening) to a surface of the panel element 104 to provide an additional current-less illuminator that absorbs light waves as its energizer. In a ZnS crystalline medium a Cu activator is used as an impurity-producing excitation. The molecules will change during light absorption and emission. The phosphorescent medium can provide sufficient glow for an extended time (approximately two hours) without incident light (from the LED 114).

An LC display glass module 110 may be included as an outer surface of the light panel 100 or may be encapsulated within the panel element 104, to achieve a compact packaging scheme.

Figure 1B:
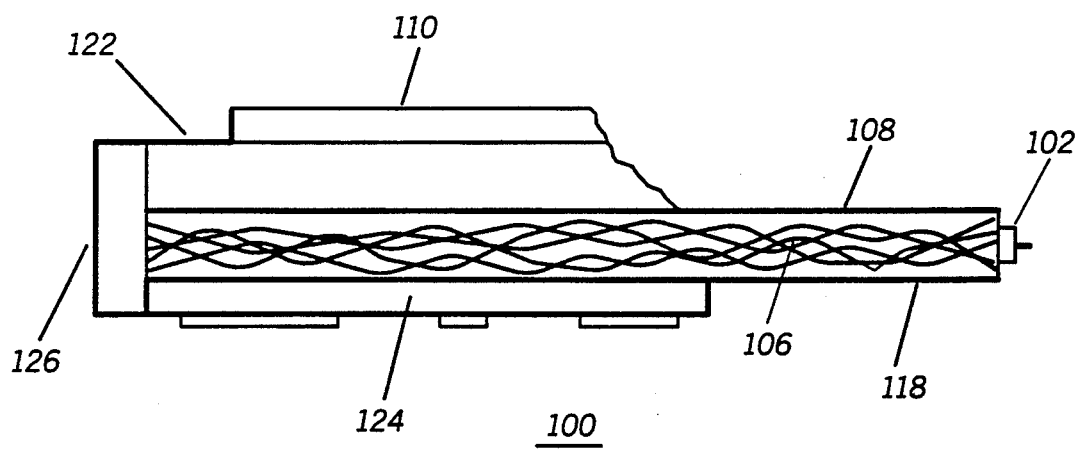
FIG. 1B shows a side view of the light panel of FIG. 1A.

Referring to FIG. 1B, a side view of the light panel 100 is shown. An aluminum foil reflector 118 may also be included on the bottom of the light panel element 104 to provide a better background for the display. A conventional flex circuit 124 for generating characters for display in the LC is located under the reflector 118. A conventional hot melt and tab circuit 122 couples the circuit 124 to the LC display glass module 110.

Figure 2:
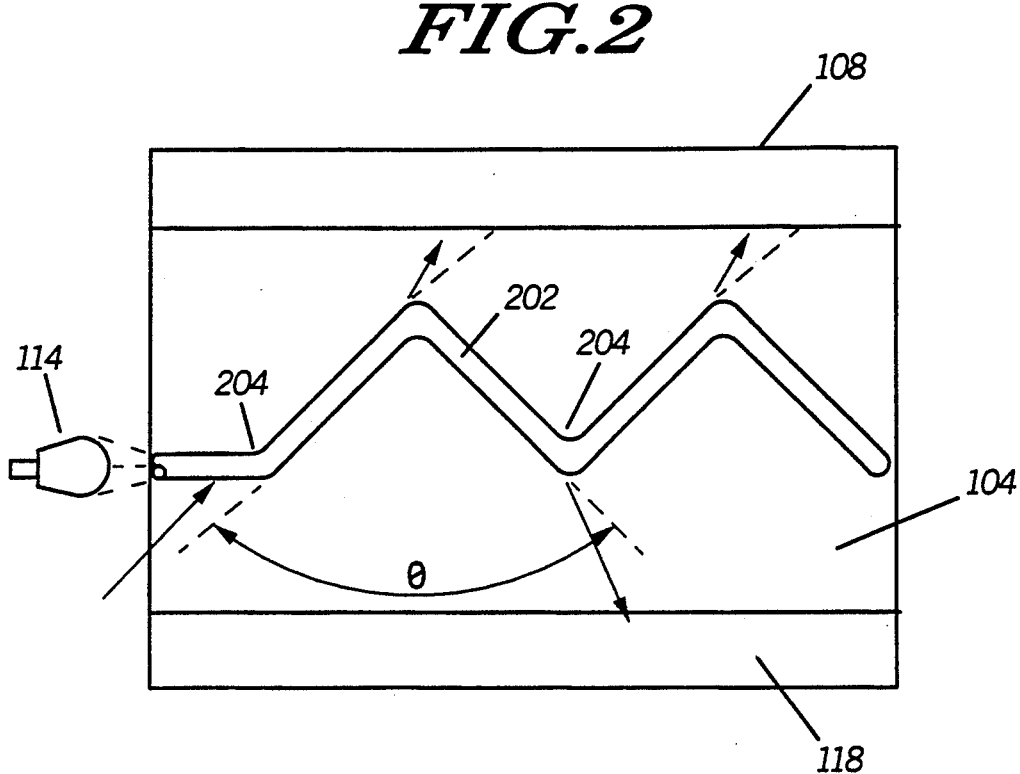
FIG. 2 shows an optical fiber strand.

Referring to FIG. 2, an optical fiber strand 202 is shown, in isolation, simulating its shape when woven with other optical fiber strands. The LED 114 produces light that propagates through the optical fiber strand 202. The fiber strands (202) are shaped as the strands in a woven mat with inclined angles ($\phi$) of approximately 120°, in increments of approximately 0.200 inches. This structure provides light that is refracted at the corners of the fiber strand 202 and dispersed throughout the light panel 100. The reflector 118 reflects light wavelets from the angular bends 204 on the bottom side of the fiber strand 202 back into the light panel element 104. The speed and light wavelet refraction change as the light travels from the medium of the fiber strand 202 to the medium of the light panel element 104, depending on the densities of those media.

Figure 3:
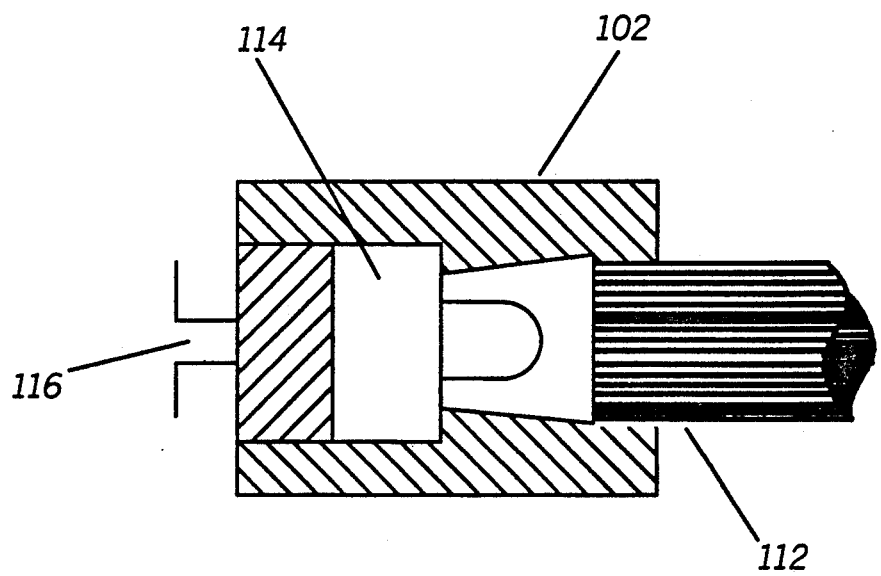
FIG. 3 shows a cross section of a ferrule and a light emitting diode.

Referring to FIG. 3, a cross section of the ferrule 102 and the light emitting diode 114 is shown. A bundled end 112 of the fiber mat 106 fits into the ferrule 102 to provide the light to be dispersed in the fiber mat 106. The ferrule 102 provides a receptacle for the LED 114 that allows for removal and replacement of the LED 114.

By providing an encapsulated package that includes an LC display and all of the required elements of the light panel 100 substantial economy of space is achieved. Moreover, encapsulation of the optical fiber mat within the transparent light panel 104 results in dispersion of the light produced by the LED 114, thus providing an effective lighting scheme for the LC display.

What is claimed is:

1. A lighting panel, comprising:
   a mat comprising a plurality of transparent optical fiber strands woven together;
   a transparent panel element molded over the mat:
   an end formed by the optical fiber strands as a bundle for receiving light;
   a ferrule connected to the bundle; and
   a light source for fitting within the ferrule.

2. The light panel of claim 1, wherein the transparent panel element comprises a reflecting wall.

3. The light panel of claim 2, further comprising a liquid crystal display encapsulated within the transparent panel element.

4. The light panel of claim 3, wherein the light source comprises a light emitting diode.

5. The light panel of claim 4, wherein the transparent panel comprises a phosphorescent coating.

6. A lighting panel, comprising:

a mat comprising a plurality of transparent optical fiber strands formed together; and a transparent panel element molded over the mat:

an end formed by the optical fiber strands woven into a bundle for receiving light a ferrule connected to the bundle; and a light source for fitting within the ferrule.

7. The light panel of claim 6, wherein the transparent panel element comprises a reflecting wall.

8. The light panel of claim 7, further comprising a liquid crystal display encapsulated within the transparent panel element.

9. The light panel of claim 8, wherein the light source comprises a light emitting diode.

10. The light panel of claim 9, wherein the transparent panel comprises a phosphorescent coating.

* * * * *